(12) United States Patent
Lee et al.

(10) Patent No.: US 7,557,886 B2
(45) Date of Patent: Jul. 7, 2009

(54) LIQUID CRYSTAL DISPLAY DEVICE AND METHOD OF FABRICATING THE SAME

(75) Inventors: Hyun Kyu Lee, Seoul (KR); Seung Chan Choi, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 611 days.

(21) Appl. No.: 11/167,131

(22) Filed: Jun. 28, 2005

(65) Prior Publication Data
US 2005/0286003 A1    Dec. 29, 2005

(30) Foreign Application Priority Data
Jun. 29, 2004  (KR) .................. 10-2004-0049792
May 27, 2005  (KR) .................. 10-2005-0045250

(51) Int. Cl.
G02F 1/1343   (2006.01)
G02F 1/136    (2006.01)

(52) U.S. Cl. .................. 349/141; 349/48; 349/144

(58) Field of Classification Search .............. 349/48, 349/141, 144
See application file for complete search history.

(56) References Cited

U.S. PATENT DOCUMENTS

2001/0048500 A1* 12/2001 Lim et al. .................... 349/141
2003/0043327 A1*  3/2003 Aoyama et al. .............. 349/141
2004/0263750 A1* 12/2004 Chae ........................... 349/141
2005/0128407 A1*  6/2005 Lee et al. .................... 349/141

FOREIGN PATENT DOCUMENTS

| CN | 1118882 | 3/1996 |
|---|---|---|
| CN | 1043084 | 4/1999 |
| CN | 1469175 | 1/2004 |

* cited by examiner

Primary Examiner—David Nelms
Assistant Examiner—Nathanael R Briggs
(74) Attorney, Agent, or Firm—McKenna Long & Aldridge LLP

(57) ABSTRACT

A liquid crystal display device includes first and second substrates; a gate line and a data line on the first substrate to define a unit pixel having first and second sub-pixel regions; first and second switching devices in the first and second sub-pixel regions; a plurality of first and second common electrodes in the first and second sub-pixel regions; a plurality of first and second pixel electrodes in the first and second sub-pixel regions; a common line shared by the unit pixel and an adjacent unit pixel; and a liquid crystal layer between the first and second substrates.

32 Claims, 9 Drawing Sheets

LIQUID CRYSTAL DISPLAY DEVICE AND METHOD OF FABRICATING THE SAME

This application claims the benefit of Korean Patent Application Nos. 2004-49792, filed on Jun. 29, 2004, and 2005-45250, filed on May 27, 2005, which are hereby incorporated by reference for all purposes as if fully set forth herein.

BACKGROUND OF THE INVENTION

1. Field of the Invention

The present invention relates to a liquid crystal display device, and particularly, to a liquid crystal display device and method of fabricating the same that can improve the production yield and aperture ratio.

2. Discussion of the Related Art

As a demand for various types of display devices increases with recent development of the information society, researches are actively continuing on flat panel display devices such as LCD (Liquid Crystal Display) devices, PDP (Plasma Display Panel) devices, ELD (Electro Luminescent Display) devices, FED (Field Emission Display) devices, VFD (Vacuum Fluorescent Display) devices and the like. Of such flat panel display devices, the LCD devices are drawing much attention due to their lightweight, thin profile, low power consumption, high picture quality, mass production advantages and simple driving method.

An LCD device displays images by individually supplying data signals to pixels arranged in a matrix form in accordance with video signals and controlling the light transmittance of each pixel. The LCD device is commonly driven by an active matrix (AM) method. The AM method is a method in which a switching device such as a thin film transistor (TFT) is added to each pixel and liquid crystal in each pixel is driven by a voltage applied thereto through the switching device.

The LCD device may be categorized into various display modes according to the type of liquid crystal. Of the various modes, the TN (twisted nematic) mode is commonly being used. The TN-mode LCD device turns ON/OFF an electric field perpendicular to the substrates and thus drives liquid crystal in such a manner that a director of the molecules of the liquid crystal can be at an angle of 0° to 90° with respect to the substrates. The TN-mode LCD device has such advantages as easy black and white display function, speedy response and low driving voltage. However, because the liquid crystal is driven perpendicular to the substrates, the TN-mode LCD device has a narrow viewing angle that causes viewing angle dependency. The viewing angle dependency means that the color or brightness of an image changes depending on the direction or angle at which a viewer views the LCD device.

In order to overcome such a disadvantage, researches are actively continuing on a new mode such as an in plane switching (hereinafter, referred to as IPS) mode LCD device in which liquid crystal is driven parallel to the substrates. When a voltage is applied, the IPS LCD device forms an in-plane electric field on a substrate and aligns the liquid crystal horizontally, thereby securing a wider viewing angle.

FIG. 1 is a plan view illustrating a unit pixel of an IPS-mode LCD device according to the related art. Referring to FIG. 1, a gate line 3 and a data line 1 formed of metal are arranged vertically and horizontally to define a unit pixel on a thin film transistor substrate of the LCD device. Although the LCD device generally includes a plurality of pixels defined by a plurality of gate and data lines, only one pixel is depicted in FIG. 1 for simplicity.

A switching device (e.g., thin film transistor (T)) including a gate electrode 4, a semiconductor layer (A) and source/drain electrodes 5 and 11 is formed near the crossing of the gate line 3 and the data line 1. The gate electrode 4 and the source/drain electrodes 5 and 11 are connected to the gate line 3 and the data line, respectively, thereby turning ON the switching device by a signal inputted through the gate line 3 and transmitting a data signal applied through the data line 1 to the pixel.

The IPS-mode LCD device further includes a common line 17 arranged parallel to the gate line 3 in the unit pixel for transmitting a common signal and at least one pair of electrodes, i.e., a common electrode 13 and a pixel electrode 15, for generating an in-plane electric field parallel to the substrate. The common electrode 13 is formed simultaneously with the gate line 3 and connected to the common line 17, and the pixel electrode 15 is formed simultaneously with the source/drain electrodes 5 and 11 and connected to the drain electrode 5 of the thin film transistor (T). A pixel electrode line 11 electrically connecting the pixel electrodes 15 overlaps the common line 17, with a gate insulation film (not shown) therebetween, and a storage capacitor (Cst) is formed in the unit pixel.

Because each pixel includes only one switching device, the IPS-mode LCD device has a problem in that the unit pixel may not properly work when the switching device is defective. Such a problem may occur not only in the IPS-mode LCD device but also in other mode LCD devices such as the TN-mode LCD device. In particular, the thin film transistors in the LCD device are formed through several deposition and etching processes in which several defects may occur. One of the most fatal defects is a short circuit between the gate electrode and the source or drain electrode, which creates a point defect in the LCD device.

SUMMARY OF THE INVENTION

Accordingly, the present invention is directed to a liquid crystal display (LCD) device and method of fabricating the same that substantially obviates one or more of the problems due to limitations and disadvantages of the related art.

An advantage of the present invention is to provide an LCD device and method of fabricating the same that can improve the production yield and aperture ratio.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes first and second substrates; a gate line and a data line on the first substrate to define a unit pixel having first and second sub-pixel regions; first and second switching devices in the first and second sub-pixel regions; a plurality of first and second common electrodes in the first and second sub-pixel regions; a plurality of first and second pixel electrodes in the first and second sub-pixel regions; a common line shared by the unit pixel and an adjacent unit pixel; and a liquid crystal layer between the first and second substrates.

In another aspect of the present invention, a method for fabricating a liquid crystal display device includes preparing a first substrate and a second substrate; forming a first metal material on the first substrate; patterning the first metal material using a first mask to form a gate line and a gate electrode; forming a transparent conductive material on the first substrate; patterning the transparent conductive material using a second mask to form a common line and a common electrode; forming a gate insulation film, an amorphous silicon layer and a n+ amorphous silicon layer on the first substrate; patterning the amorphous silicon layer and the n+ amorphous silicon layer using a third mask to form a semiconductor layer and an ohmic contact layer; forming a second metal material on the first substrate; patterning the second metal material using a fourth mask to form a data line, a source electrode and first and second drain electrodes; forming a passivation film on the first substrate; patterning the passivation film using a fifth mask to form a contact hole; forming a transparent conductive material on the passivation film; and patterning the transparent conductive material using a sixth mask to form a pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
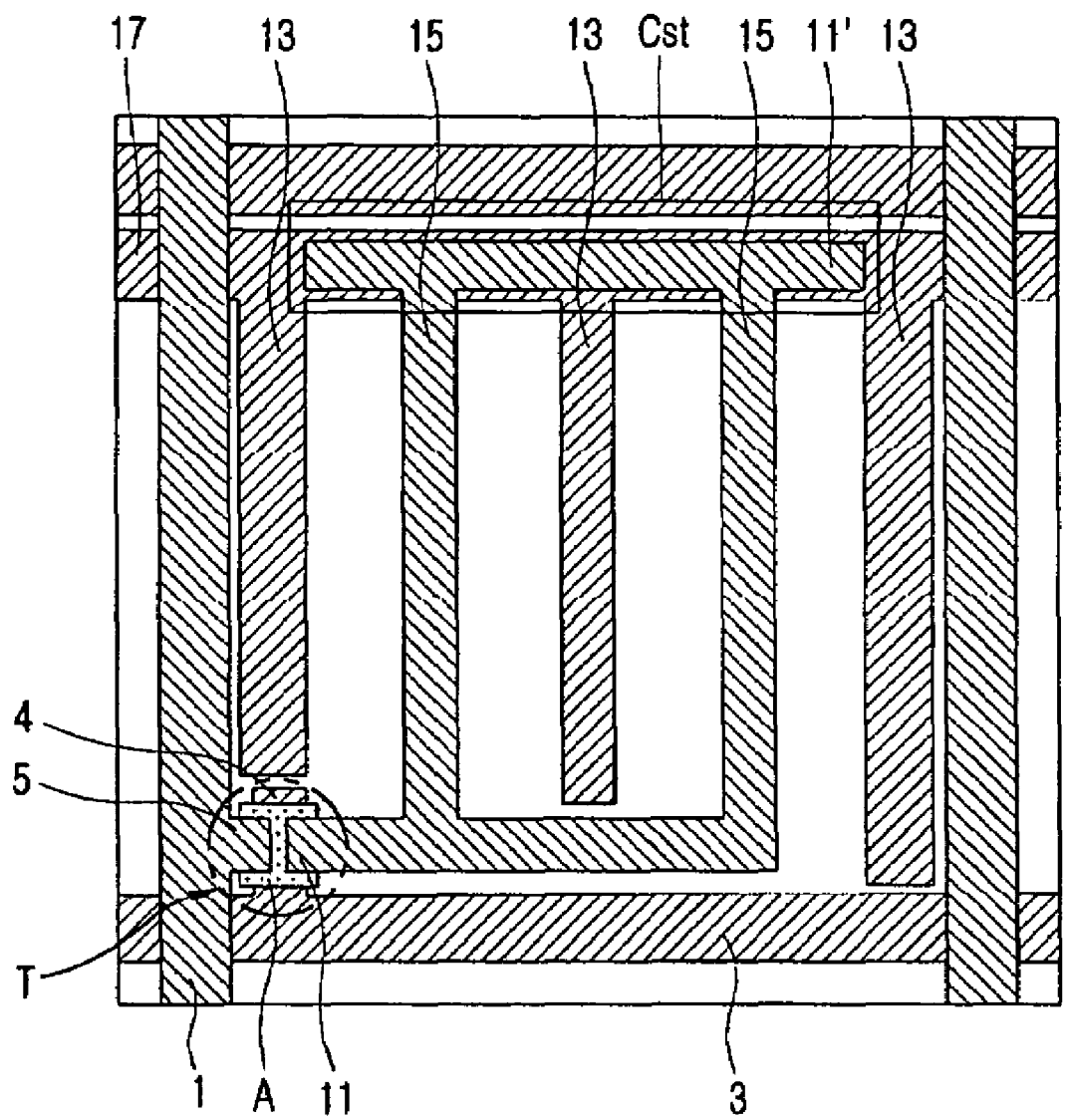
FIG. 1 is a plan view illustrating a unit pixel of an IPS-mode LCD device according to the related art.
Figure 2A:
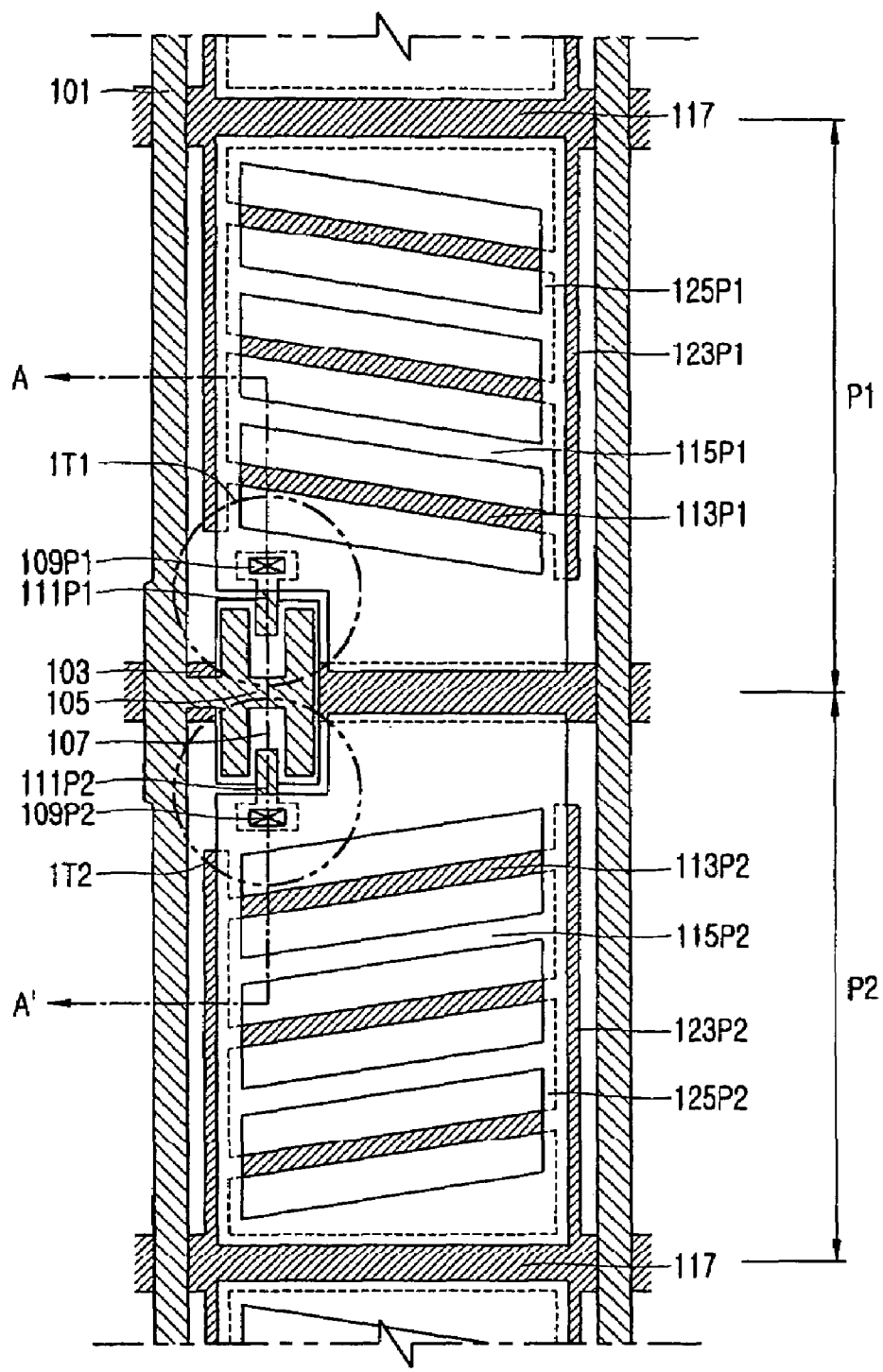
FIG. 2A is a plan view illustrating a unit pixel of an LCD device according to a first embodiment of the present invention.
Figure 2B:
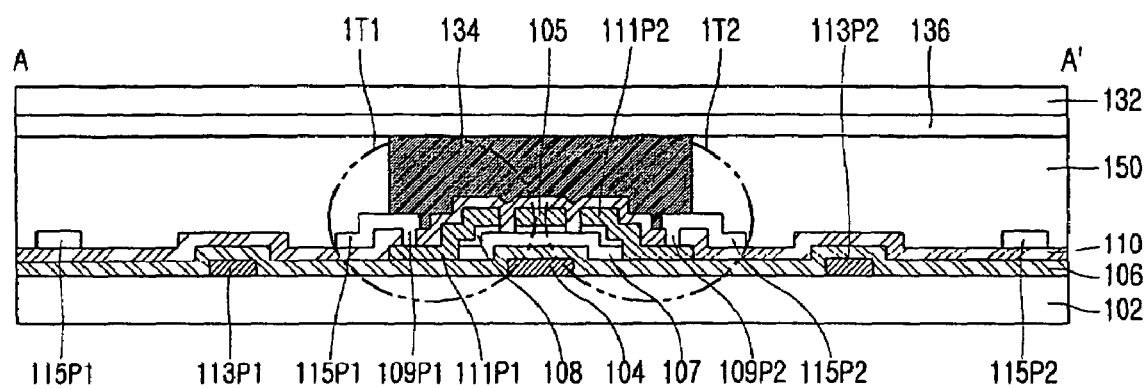
FIG. 2B is a cross-sectional view taken along the line A-A' in FIG. 2A.

FIG. 2A is a plan view illustrating a unit pixel of an LCD device according to a first embodiment of the present invention, and FIG. 2B is a cross-sectional view taken along the line A-A' in FIG. 2A.

Referring to FIGS. 2A and 2B, the unit pixel of the LCD device is defined by a gate line 103 and a data line 101 on a first substrate and divided into first and second sub-pixel regions. First and second switching devices 1T1 and 1T2 are provided in the first and second sub-pixel regions P1 and P2, respectively, and the same scan signal is applied to the first and second sub-pixel regions P1 and P2. The first and second switching devices 1T1 and 1T2 have a one-gate-two thin film transistor structure. The first and second switching devices 1T1 and 1T2 are formed symmetrically with respect to the gate line 103.

Each of the switching devices 1T1 and 1T2 includes a gate electrode 104 formed as a part of the gate line 103 on the first substrate 102, a gate insulation film 106 formed on the gate electrode 104, a semiconductor layer 107 formed on the gate insulation film 106, and an ohmic contact layer 108 formed on the semiconductor layer 107. The switching devices 1T1 and 1T2 further respectively include first and second drain electrodes 111P1 and 111P2, both of which share a source electrode 105 formed as a part of the data line 101 on the ohmic contact layer 108 and are formed at both sides of the source electrode 105 at a predetermined interval therebetween.

As described above, the first and second switching devices 1T1 and 1T2 share the gate electrode 104 and the source electrode 105. Therefore, when the semiconductor layer 107 is activated by a scan signal of the gate line 103, the same data signal is simultaneously transmitted to the first and second drain electrodes 111P1 and 11P2 from the data line 10 through the source electrode 105, and the data signal is applied to both first and second sub-pixel regions P1 and P2. Because the first and second sub-pixel regions P1 and P2 of the unit pixel are driven by different switching devices, a defective region in the LCD can be reduced.

In particular, a switching device such as a thin film transistor is fabricated through several deposition and etching processes in which several defects may occur. For example, an electrical short circuit may occur between the source and the gate electrode by a foreign substance inserted between the source and drain electrodes, or may occur between the drain electrode and an adjacent data line. For example, the drain electrode may extend along a direction of an adjacent data line parallel to the gate line in order to prevent a light leakage occurring around the gate line. In such a case, a short circuit may occur between the drain electrode and the data line due to a defect in the manufacturing process. When a short circuit occurs between the source and drain electrodes or between the drain electrode and the data line, a brightness defect occurs and the image quality of the LCD device deteriorates. Such a brightness defect also occurs when the semiconductor pattern under the drain electrode becomes defective and is formed up to a lower portion of the pixel electrode.

In order to solve such a brightness defect, an attempt has been made to remove the cause of the defect by irradiating a laser beam to a region where an abnormal pattern exists in the switching device. However, such a method has the following problems. First, every pixel should be examined to detect a brightness defect. Second, when the size of the defective pattern is smaller than 2 µm, the defect may not be detected because of the limitations of the detecting equipment. Third, the production yield may be reduced because of the additional laser irradiation process.

However, in a pixel structure in accordance with the present invention, because the pixel is divided into two sub-pixel regions and each of the two sub-pixel regions individually receives a signal to operate each switching device. Thus, even when one of the switching devices has a defect and does not function, a sub-pixel region where one switching device is in a normal operation can be driven. Accordingly, a defective region in the LCD device decreases, as compared with the related art.

First and second pixel electrodes 115P1 and 115P2 having a stripe shape are provided in first and second sub-pixel regions P1 and P2 at regular intervals, respectively, in accordance with an embodiment of the present invention. The first and second pixel electrodes 115P1 and 115P2 receive a data signal transmitted from the first and second drain electrodes 111P1 and 111P2 of the first and second switching devices 1T1 and 1T2. The data signal is transmitted to the first and second pixel electrodes 115P1 and 115P2 from the first and second drain electrodes 111P1 and 111P2 of the first and second switching devices 1T1 and 1T2 through first and second contact holes 109P1 and 109P2 formed on an upper passivation film 110.

First and second common electrodes 113P1 and 113P2 having a stripe shape are provided in the first and second sub-pixel regions P1 and P2, respectively. The first and second common electrodes 113P1 and 113P2 alternate with the first and second pixel electrodes 115P1 and 115P2 at a predetermined interval therebetween, thereby generating an in-plane electric field on a first substrate 102 with the first and second pixel electrodes 115P1 and 115P2. The common lines 117 are provided at both ends of the unit pixel and electrically connected to the first or second common electrode 113P1 or 113P2 to apply a common signal. The common lines 117 are shared by the first or second common electrode 113P1 or 113P2 and a first or second common electrode of an adjacent sub-pixel region. The second common electrode 113P2 of the second sub-pixel region defined by the $N^{th}$ gate line 103 and the first common electrode 113P1 of the first sub-pixel region defined by the $N+1^{th}$ gate line extend from the common line 117 formed at their boundary regions to receive a common signal. Accordingly, the LCD device in accordance with the present invention has a structure in which three sub-pixels require two common lines, thereby reducing the number of the common lines and increasing the aperture ratio of the LCD device.

A first common electrode connection line 123P1 electrically connecting a plurality of the first common electrodes 113P1 and a first pixel electrode connection line 125P1 electrically connecting a plurality of first pixel electrodes 115P1 are formed parallel to the data line 101 at an outer edge of the first sub-pixel region and overlap each other, with the gate insulation film 106 and the passivation film 110 therebetween. Also, a second common electrode connection line 123P2 electrically connecting a plurality of second common electrodes 113P2 and a second pixel electrode connection line 125P2 electrically connecting a plurality of second pixel electrodes 115P2 are formed parallel to the data line 101 at an outer edge of the second sub-pixel region and overlap each other, with the gate insulation film 106 and the passivation film 110 therebetween. In such a manner, a storage capacitor is formed in the unit pixel.

The first and second common electrode connection lines 123P1 and 123P2 are not provided to generate an electric field for driving the liquid crystal within the first and second sub-pixel regions P1 and P2, but they shield an influence of a signal of the data line 101 on the first and second pixel electrodes 115P1 and 115P2. Therefore, the first and second common electrode connection lines 123P1 and 123P2 are provided at a position closer to the data line 101 than the pixel electrode connection lines 125P1 and 125P2 so as to effectively shield an influence of the signal of the data line 101.

One side of each of the first and second pixel electrodes 115P1 and 115P2 overlaps an adjacent gate line 103 to prevent a light leakage from occurring near the gate line, which contributes to reduce a line width of a black matrix on the gate line 103 or to exclude a black matrix at the region. An overlapping structure between the gate line 103 and the pixel electrode 115P1 and 115P2 can minimize accumulation of a DC component by minimizing an area of a dielectric body existing between the gate line 103 and the pixel electrode 115P1 and 115P2, thereby reducing an afterimage defect generated due to the residual DC component. Also, in the present invention, because the gate line 103 is provided at a central line of the unit pixel, not at a boundary region between two neighboring pixels, both first and second pixel electrodes 115P1 and 115P2 overlap only the gate line 103 of the corresponding pixel and are not affected by signals applied to the gate lines of adjacent pixels. Accordingly, a voltage fluctuation of a pixel electrode due to gate signals of the adjacent pixels is reduced, a light leakage due to a voltage distortion occurring at a boundary region between neighboring pixels is prevented, and defects such as a flicker can be minimized.

In the LCD device in accordance with the present invention, the first and second common electrodes 113P1 and 113P2 and the first and second pixel electrodes 115P1 and 115P2 form an inclination angle of 0 to 45° with the data line 101. Accordingly, an in-plane electric field generated by the first common electrode 113P1 and the first pixel electrode 115P1 and by the second common electrode 113P2 and the second pixel electrode 115P2 form an inclination angle of 0 to 45° with the data line 101 so that a rubbing direction of an alignment film can be perpendicular to the data line 101. In other words, a rubbing process, which induces an initial alignment of liquid crystal molecules, is performed in the direction of an electric field formed between the data line 101 and the first and second pixel electrode lines 123P1 and 123P2 at an outer edge of the unit pixel, thereby allowing a horizontal alignment of the liquid crystal. Thus, when a voltage is not applied thereto, liquid crystal molecules adjacent to the data line 101 are not distorted by a residual voltage, thereby preventing a light leakage from occurring near the data line 10 and minimizing a width of a black matrix on the data line 101 or excluding a black matrix at the region.

As a result, the LCD device in accordance with the present invention can minimize or prevent a light leakage from occurring near the gate line 103 and the data line 101 because of the overlapping structure between the gate line 103 and the first and second pixel electrodes 115P1 and 115P2 and the horizontal alignment of the liquid crystal, thereby excluding a black matrix at the corresponding regions and improving the brightness and aperture ratio thereof.

Such a structure described above requires only a minimum black matrix at a channel part of the switching device. The black matrix at a channel part of the switching device may be replaced with a column spacer 134 formed on the first substrate 102 or the second substrate 132 to block light. This allows not only to implement a black-matrix-free structure that minimizes the process margin for forming a black matrix, but also to eliminate a mask process required for forming a black matrix, thereby simplifying the fabrication process of the LCD device.

Besides a color filter layer 136 for implementing colors, the column spacer 134 serving as a black matrix to prevent light from leaking to upper portions of the first and second switching devices 1T1 and 1T2 and the like may be formed on the second substrate 132. First and second alignment films (not shown), which determine an initial alignment direction of liquid crystal, are formed on facing surfaces of the first and second substrates 102 and 103, and a liquid crystal layer 150 is provided therebetween.

As described above, the pixel structure in accordance with the first embodiment can reduce a defective region in the LCD device by dividing a pixel region into sub-pixel regions and individually driving the sub-pixel regions, but the pixel can still be a point defect. Therefore, a second embodiment of the present invention provides an LCD device that can reduce a possibility of having a defective pixel. A pixel structure of the second embodiment is almost the same as the structure of the first embodiment and thus only the differences between the first and second embodiments will now be described.

Figure 3:
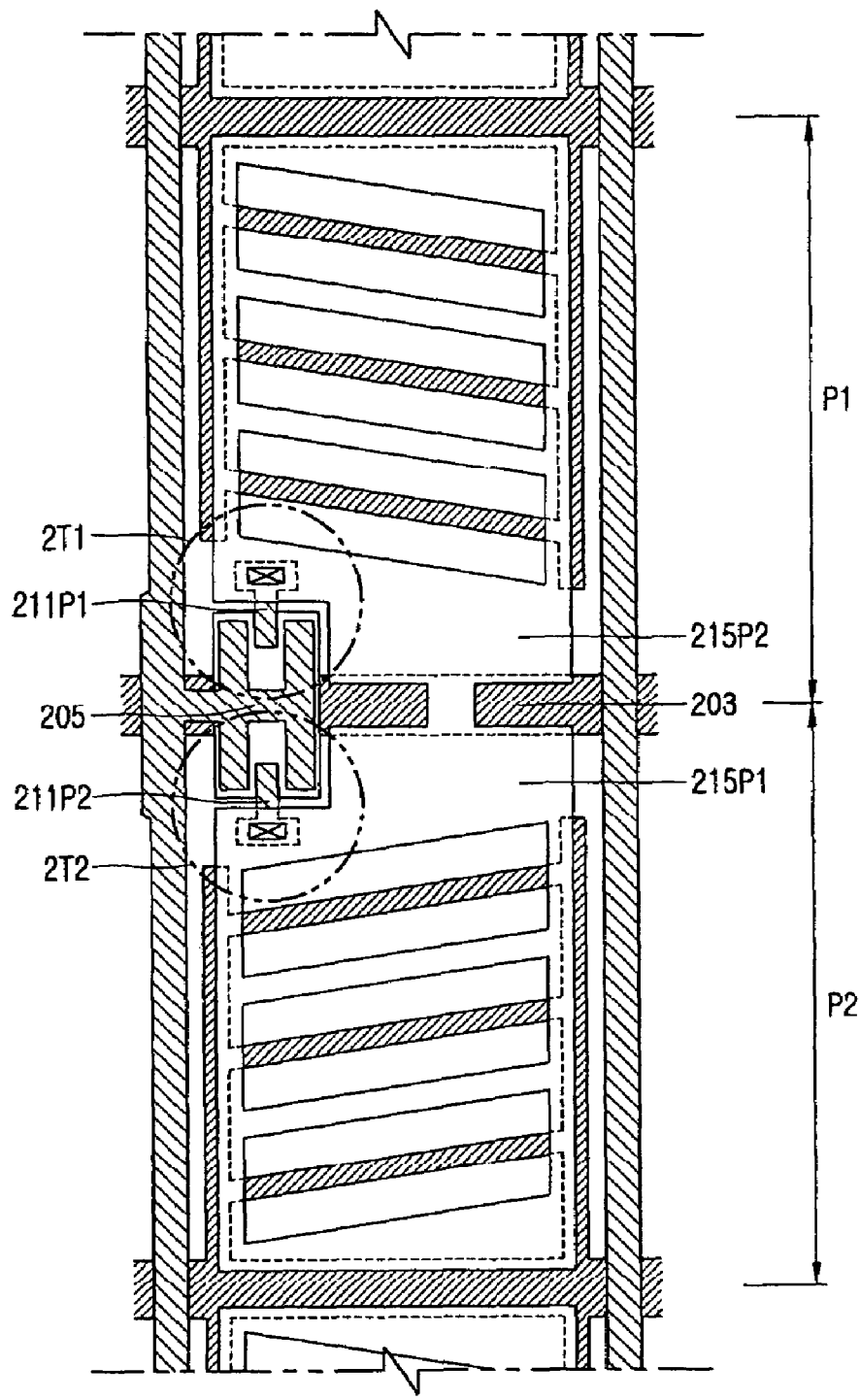
FIG. 3 is a plan view illustrating a unit pixel of an LCD device according to a second embodiment of the present invention.

FIG. 3 is a plan view illustrating a unit pixel of an LCD device according to the second embodiment of the present invention. In order to reduce a possibility of having a defective pixel, a first pixel electrode 215P1 of a first sub-pixel region P1 is connected to a second pixel electrode 215P2 of a second sub-pixel region P2 at an upper portion of a gate line 203. In other words, because the first and second pixel electrodes 215P1 and 215P2 are electrically connected to each other, both pixel electrodes 215P1 and 215P2 can receive a data signal even when one of a first switching device 2T1 and a second switching device 2T2 does not function due to a defect such as a short circuit between a source electrode 205 and a first drain electrode 211P1 or between the source electrode 205 and a second drain electrode 211P2. Accordingly, a possibility of having a defective pixel can be reduced.

Figure 4A:
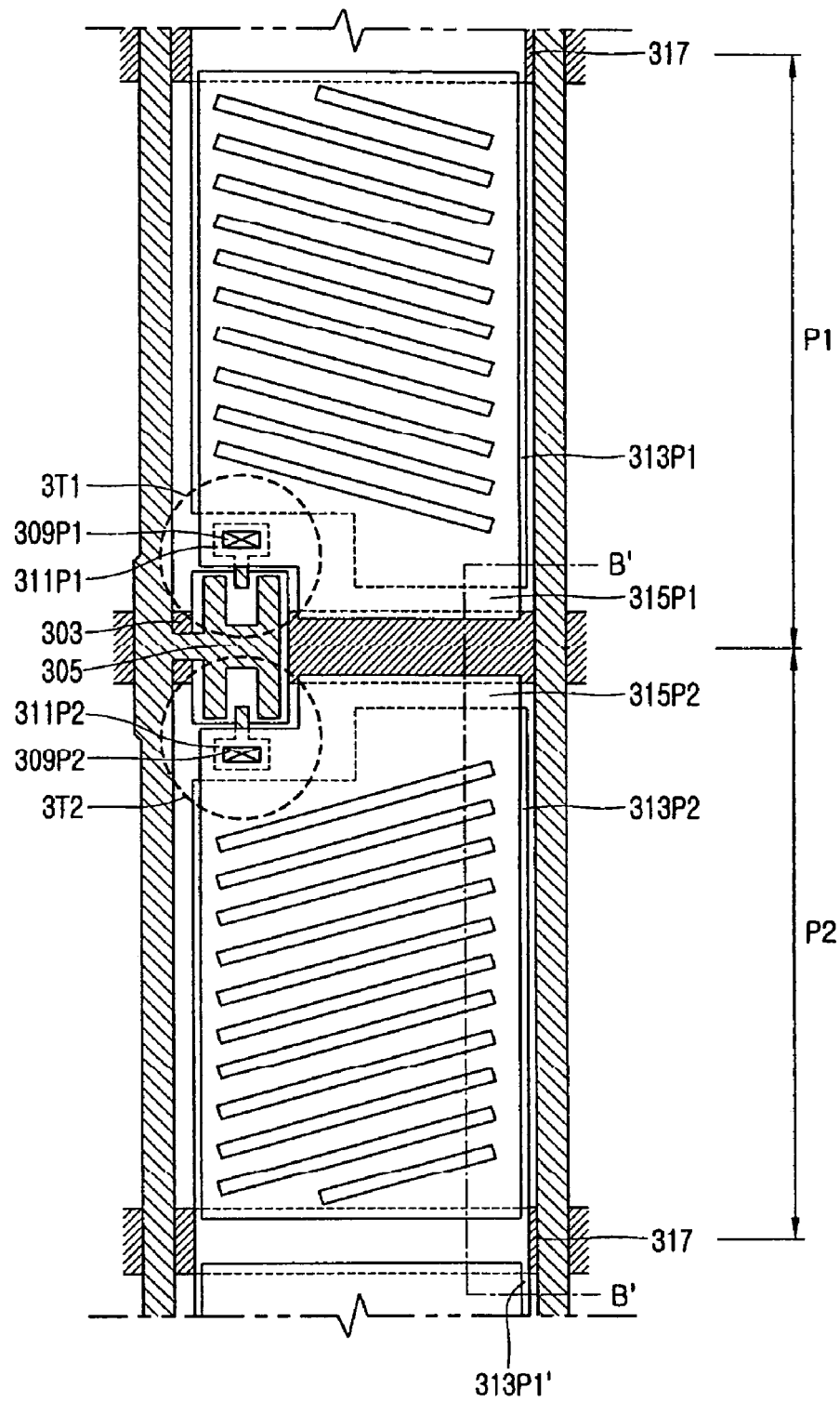
FIG. 4A is a plan view illustrating a unit pixel of an LCD device according to a third embodiment of the present invention.
Figure 4B:
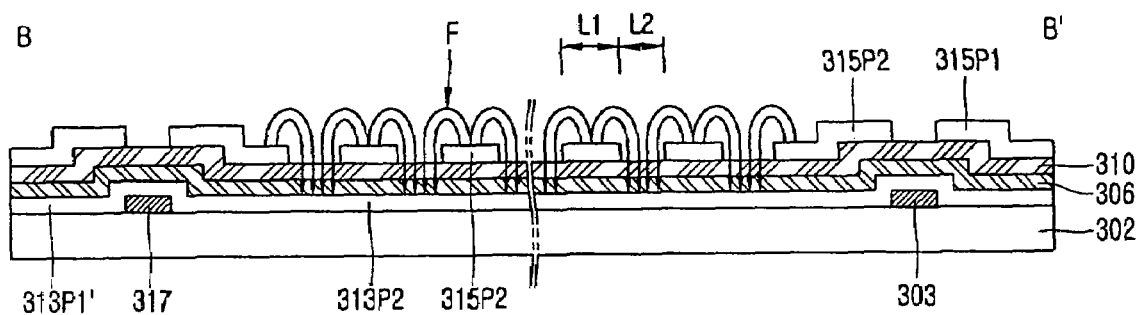
FIG. 4B is a cross-sectional view taken along line B-B' in FIG. 4A.

FIGS. 4A and 4B are views illustrating a unit pixel of an LCD device according to a third embodiment of the present invention and a cross-sectional view taken along the line B-B' in FIG. 4A, respectively. The present embodiment provides an LCD device which can achieve a high transmittance and a field reinforcement effect. A pixel structure of the third embodiment is also similar to that of the first embodiment and thus only the differences between the first and third embodiments will now be described.

Referring to FIGS. 4A and 4B, first and second common electrodes 313P1 and 313P2 are formed as a plate shape on a first substrate 302, and first and second pixel electrodes 315P1 and 315P2 are formed on a different layer from the first and second common electrodes 313P1 and 313P2 and have a plurality of slits. The first and second common electrodes 313P1 and 313P2 and the first and second pixel electrodes 315P1 and 315P2 are formed of a transparent conductive material such as ITO (Indium Tin Oxide), IZO (Indium Zinc Oxide), ITZO (Indium Tin Zinc Oxide) or TO (Tin Oxide). Intervals between the first common electrode 313P1 and the first pixel electrode 315P1 and between the second common electrode 313P2 and the second pixel electrode 315P2 are narrower than a cell gap, thereby generating a fringe field (F), an in-plane electric field, on the first substrate 302.

When the intervals between the slits of the first and second pixel electrodes 315P1 and 315P2 (e.g., widths of the first and second pixel electrodes, L1) are sufficiently narrow, all liquid crystal molecules (not shown) on the first substrate 302 including upper portions of the first and second pixel electrodes 315P1 and 315P2 can be substantially operated by an in-plane electric field (F) generated between both electrodes. Accordingly, the LCD device in accordance with the present embodiment can have a high transmittance and a high aperture ratio, as compared with the LCD devices of the first and second embodiments.

In addition, the first and second common electrodes 313P1 and 313P2 are formed as a plate shape and each of the intervals (electrode width, L1) between the slits of the first and second pixel electrodes 315P1 and 315P2 is wider than a width (L2) of the slit, so that an overlapping area between both electrodes having a gate insulation film 306 and a passivation film 310 therebetween increases, thereby increasing a capacitance of a storage capacitor formed between both electrodes. Therefore, a voltage drop (ΔVp) of the first and second pixel electrodes 315P1 and 315P2 can be reduced and a field reinforcement effect can be achieved.

Furthermore, the first and second common electrodes 313P1 and 313P2 may be integrally formed with the common electrodes of the sub-pixel regions of the neighboring pixels. In other words, the second common electrode 313P2 of the second sub-pixel region is connected to a first common electrode 313P1' of a first sub-pixel region of an adjacent pixel. Accordingly, a common line 317 of a metal layer formed at a boundary region between the two neighboring pixels is shared by the second common electrode 313P2 of the second sub-pixel region defined by the $N^{th}$ gate line and the first common electrode 313P1' of the first sub-pixel region defined by the $N+1^{th}$ gate line, and applies a common signal to the first and second common electrodes 313P1' and 313P2. Accordingly, because the LCD device in accordance with the present invention requires two common lines per three sub-pixels, the number of the common lines is reduced and the aperture ratio of the LCD device increases.

The common line 317 may be formed of a separate metal layer, as illustrated in the drawings, but it may be formed of a transparent conductive material and integrally formed with the second common electrode 313P2 of the second sub-pixel region defined by the $N^{th}$ gate line 103 and the first common electrode 313P1' of the first sub-pixel region defined by the $N+1^{th}$ gate line. In order to prevent a short circuit between the first and second common electrodes 313P1 and 313P2 and a gate line 303 within the pixel, the first and second common electrodes 313P1 and 313P2 are spaced from the gate line 303 at an interval of 10 μm or more.

The first and second pixel electrodes 315P1 and 315P2 slightly overlap upper and lower corners of the gate line 303 disposed at a central line of the pixel, respectively. Thus, a line width of a black matrix (not shown) formed on a second substrate (not shown) for preventing a light leakage may be minimized or may not be required, thereby increasing the aperture ratio and brightness of the LCD device. Such a structure may also reduce an area of a dielectric body between the gate line 303 and the first and second pixel electrodes 315P1 and 135P2, as compared with a structure in which the first and second pixel electrodes 315P1 and 315P2 do not overlap the gate line 303. Accordingly, a residual voltage component accumulated within the dielectric body is reduced, thereby preventing or minimizing an afterimage defect.

In the above-disclosed structure, because the gate line 303 is disposed at a central line of the pixel, not at a boundary region of two neighboring pixels, the first and second pixel electrodes 315P1 and 315P2 formed at first and second sub-pixel regions P1 and P2 only overlap the gate line 303 of the corresponding pixel and are not affected by the gate signals of the adjacent pixels. Thus, the first and second pixel electrodes 315P1 and 315P2 are only affected by the gate line 303 of the corresponding pixel, thereby preventing a light leakage due to a voltage distortion occurring at a boundary region between the neighboring pixels and minimizing a display defect such as a flicker or the like.

The first and second pixel electrodes 315P1 and 315P2 also overlap the common lines 317 at boundary regions of the unit pixel to minimize a light leakage. When an overlapping area between the first and second pixel electrodes 315P1 and 315P2 and the common lines 317 becomes excessively large, a capacitance of a storage capacitor becomes greater than needed, which may cause a delay of a signal due to a residual parasitic capacitor. Accordingly, the first and second pixel electrodes 315P1 and 315P2 may only overlap one corner of the common lines 317.

In the LCD device according to the third embodiment, the first and second common electrodes 313P1 and 313P2 and the first and second pixel electrodes 315P1 and 315P2 are formed of a transparent conductive material such as ITO or the like on an entire surface of the pixel. Accordingly, a disclination phenomenon, which is caused by a height difference (or step difference) above or under the gate line 303 during a rubbing process and generates a light leakage, can also be prevented or minimized.

In addition, the unit pixel is divided into first and second sub-pixel regions P1 and P2 with respect to the gate line 303 disposed at a central line of the pixel. First and second switching devices 3T1 and 3T2 are respectively provided at the first and second sub-pixel regions P1 and P2 to apply a signal to the first and second pixel electrodes 315P1 and 315P2 through first and second contact holes 309P1 and 309P2. The first and second switching devices 3T1 and 3T2 have a one-gate-two thin film transistor structure and are symmetrical with respect to the gate line 303. Also, the first and second switching devices 3T1 and 3T2 share a gate electrode (not shown) and a source electrode 305 so as to transmit a data signal to both the first and second pixel electrodes 315P1 and 315P2 via first and second drain electrodes 311P1 and 311P2 when a scan signal is applied to the gate line 303. Therefore, the first and second sub-pixel regions P1 and P2 constituting a unit pixel of the LCD device in accordance with the present embodiment are also individually driven by different switching devices (the first and second switching devices 3T1 and 3T2). Accordingly, a possibility that the entire pixel does not function due to a defect decreases, even when the first or second switching device 3T1 or 3T2 is defective.

Figure 5:
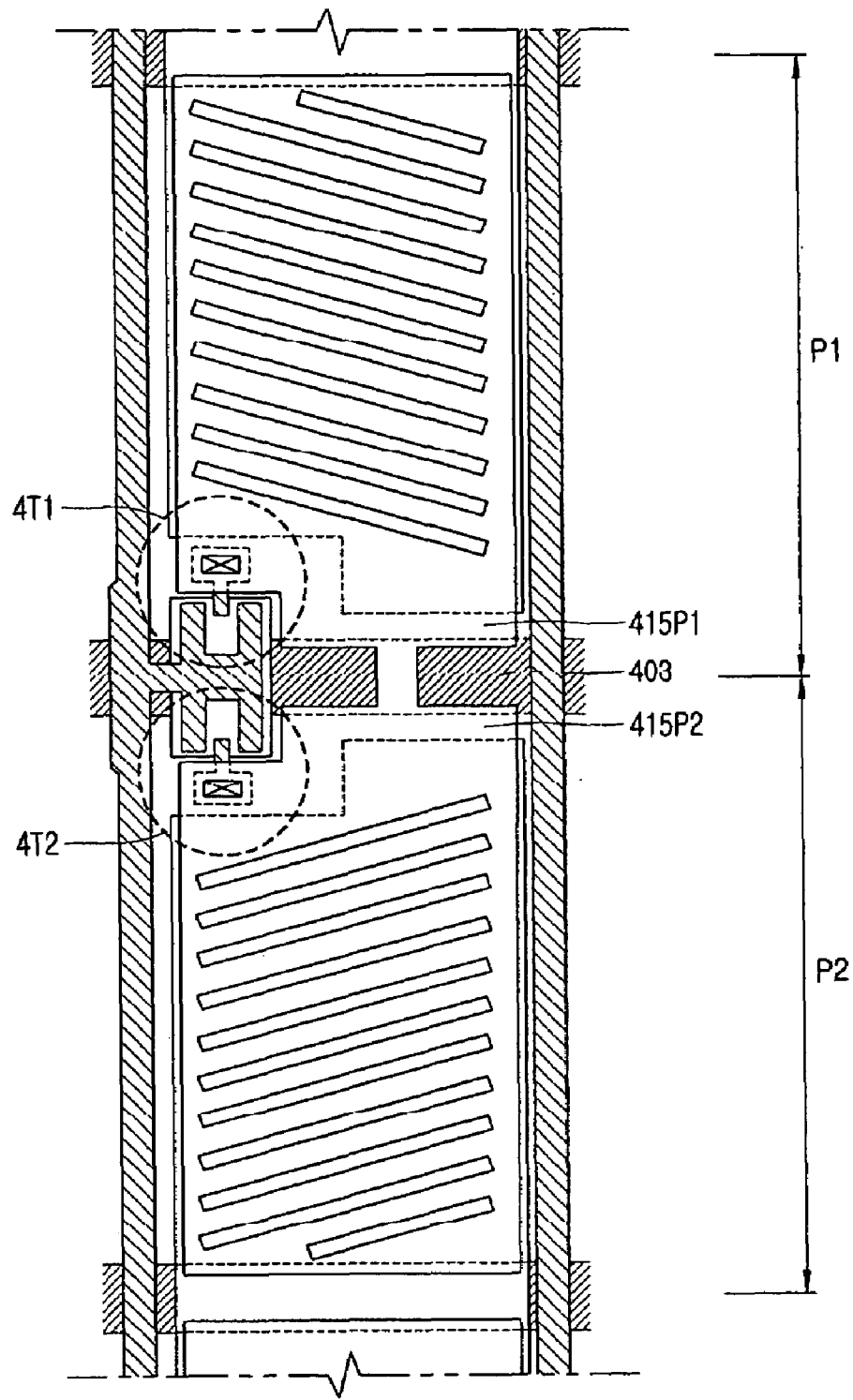
FIG. 5 is a plan view illustrating a unit pixel of an LCD device according to a fourth embodiment of the present invention.

An LCD device according to a fourth embodiment of the present invention will now be described. As illustrated in FIG. 5, a unit pixel of the fourth embodiment has a structure in which first and second pixel electrodes 415P1 and 415P2 are connected to each other at an upper portion of a gate line 403. A pixel structure of the fourth embodiment is similar to that of the third embodiment and thus only the differences between the first and second embodiments will now be described.

Referring to FIG. 5, the first pixel electrode 415P1 of a first sub-pixel region P1 and the second pixel electrode 415P2 of a second sub-pixel region P2 are connected to each other at an upper portion of the gate line 403. In other words, because the first and second pixel electrodes 415P1 and 415P2 are electrically connected to each other, both pixel electrodes 415P1 and 415P2 can receive a data signal, even when one of a first switching device 4T1 and a second switching device 4T2 does not function. Accordingly, a possibility of having a defective pixel can be reduced.

In the first to fourth embodiments, the first and second switching devices are located at a central line of the unit pixel and the first and second sub-pixel regions are symmetrically formed, so that a signal delay caused by a distance between the switching devices and electrodes within the pixel is minimized and therefore an afterimage defect is minimized or prevented. Also, the vertically symmetrical electrode structure prevents a color shift phenomenon and an afterimage defect and allows the LCD device to have a high image quality, a high transmittance, a high aperture ratio and a wide viewing angle. In addition, the first and second common electrodes and the first and second pixel electrodes in accordance with the present invention are formed of a transparent conductive material such as ITO (Indium Tin Oxide), IZO (Indium Zinc Oxide), ITZO (Indium Tin Zinc Oxide), TO (Tin Oxide) or the like, but they may be formed of other conductive materials such as an opaque metal material.

Hereinafter, a method of fabricating an LCD device in accordance with the present invention will now be described with reference to the accompanying drawings.

FIGS. 6A to 6D are cross-sectional views taken along the line A-A' in FIG. 2A and illustrating a method of fabricating an LCD device according to the present invention. A method of fabricating an LCD device according to the present invention will be described with an exemplary embodiment in which a column spacer is formed on a first substrate (thin film substrate) to block light and maintain a predetermined cell gap.

Figure 6A:
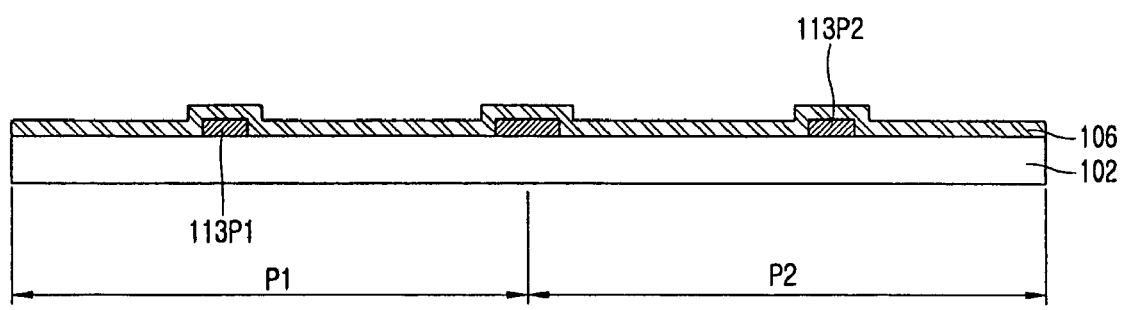
FIGS. 6A to 6D are cross-sectional views taken along the line A-A' in FIG. 2A and illustrating a method of fabricating an LCD device according to an embodiment of the present invention.

As illustrated in FIG. 6A, a transparent first substrate 102 made of glass or quartz and a second substrate (not shown) are first prepared. Then, a first metal material such as Mo, Mo alloy, Al, Al alloy, Ti, Ti alloy, Ta, Ta alloy, Co, Co alloy, Ni, Ni alloy, Cu or Cu alloy is formed on the first substrate 102 and patterned using a first mask to thereby form a gate line (not shown), a gate electrode 104, first and second common electrodes 113P1 and 113P2 and a common line (not shown). Then, an inorganic material such as SiNx or SiOx is deposited on an entire surface of the first substrate 102 including the gate electrode 104 and the first and second common electrodes 131P1 and 113P2 by a CVD (Chemical Vapor Deposition) method to thereby form a gate insulation film 106.

Figure 6B:
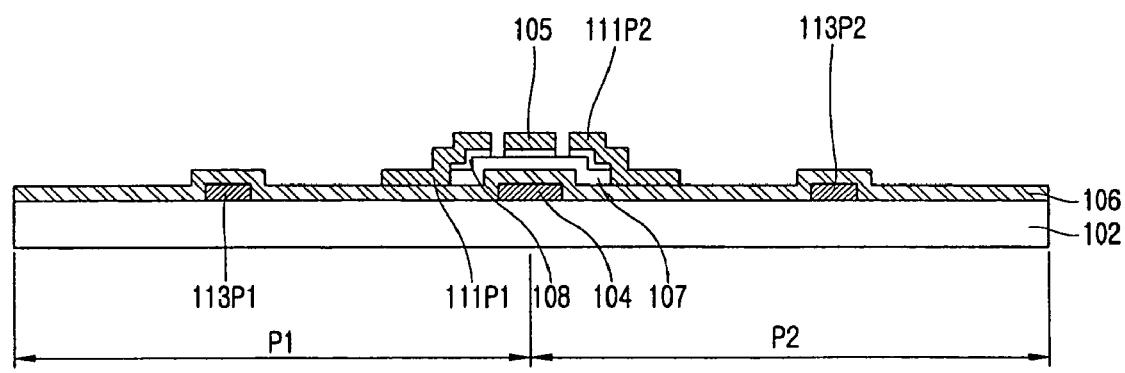

As illustrated in FIG. 6B, amorphous silicon and n+ amorphous silicon are then formed on the gate insulation film 106 and patterned using a second mask to thereby form a semiconductor layer 107 and an ohmic contact layer 108 on the gate electrode 104. A second metal material such as Mo, Mo alloy, Al, Al alloy, Ti, Ti alloy, Ta, Ta alloy, Co, Co alloy, Ni, Ni alloy, Cu or Cu alloy is deposited on an entire surface of the first substrate 102 including the ohmic contact layer 108. The second metal material is then patterned using a third mask to thereby form a data line (not shown), a source electrode 105 extending from the data line, and first and second drain electrodes 111P1 and 111P2 disposed on the semiconductor layer 107 at a predetermined interval from the source electrode 105. The data line is disposed perpendicularly to the gate line to define a pixel with the gate line and divides the pixel into first and second sub-pixel regions (P1 and P2).

Figure 6C:
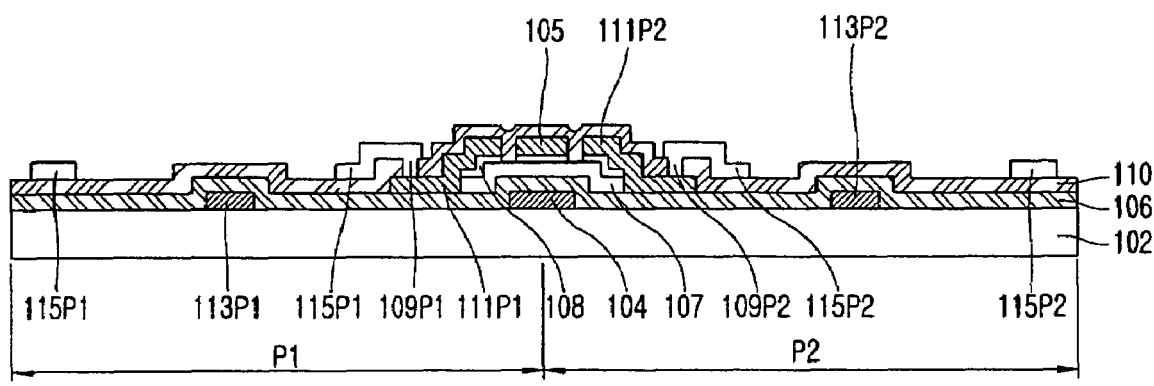

As illustrated in FIG. 6C, a transparent organic material having a low conductivity such as benzocyclobutene or acryl is then applied on an entire surface of the first substrate 102 including the source electrode 105 and the first and second drain electrodes 111P1 and 111P2 to thereby form a passivation film 110. Then, the passivation film 110 is patterned using a fourth mask to thereby form a first contact hole 109P1 exposing part of the first drain electrode 111P1 and a second contact hole 109P2 exposing part of the second drain electrode 111P2.

A transparent conductive material such as ITO (Indium Tin Oxide), IZO(Indium Tin Zinc Oxide) or TO (Tin Oxide) is then deposited on the passivation film 110 and is patterned using a fifth mask to thereby form first and second pixel electrodes 115P1 and 115P2 for generating an in-plane electric field on the first substrate 102 together with the first and second common electrodes 113P1 and 113P2. The first and second pixel electrodes 115P1 and 115P2 are connected to the first and second drain electrodes 111P1 and 111P2 constituting the first and second switching devices 1T1 and 1T2 to receive an image signal.

Figure 6D:
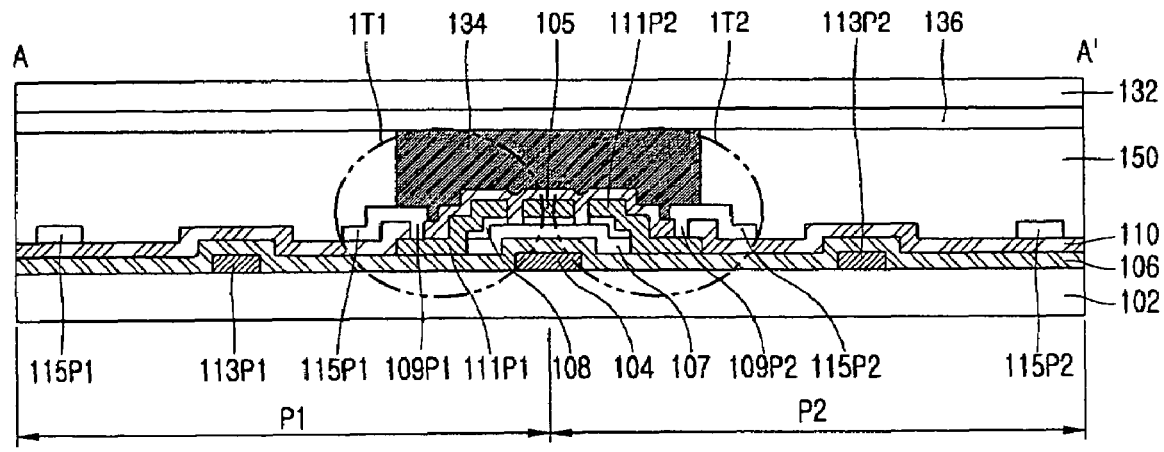

Next, an organic film (not shown) such as photosensitive resin is deposited on the first substrate 102 including the first and second pixel electrodes 115P1 and 115P2 and the passivation film 110 to form a column spacer. A column spacer 134 is formed on the first and second switching devices 1T1 and 1T2 by irradiating UV light onto the organic film through the transmitting region of a sixth mask and developing the organic film, as illustrated in FIG. 6D. The column spacer 134 not only maintains a cell gap between the first substrate 102 and the second substrate, but also prevents a light leakage at the upper portions of the first and second switching devices 1T1 and 1T2 as a black matrix. As a result, a mask process for forming a separate black matrix may be omitted in the fabricating process of the LCD device.

Although not shown in the drawings, a first alignment film determining an initial alignment direction of liquid crystal is then applied on the first substrate 102 and a rubbing process is performed on the first alignment film. In a similar manner, a second alignment film is applied on a second substrate 132 having a color filter layer 136 and a rubbing process is performed on the second alignment film. The first substrate 102 and the second substrate 132 are then attached to each other and a liquid crystal layer 150 is provided in a space between the first and second substrates 102 and 132, thereby completing the fabricating process of the LCD device. According to the principles of the present invention, the column spacer 134 may be formed on the second substrate 132. In such a case, a color filter layer including, for example, R(red), G(green), B(blue) color filters is formed on a transparent second substrate and a column spacer is formed at a region on the second substrate, which corresponds to the first and second switching devices on the first substrate, in a similar manner described above.

As described above, a method of fabricating an LCD device in accordance with the present invention can simplify the fabrication process of the LCD device and reduce its fabrication cost, because a process for forming a black matrix on the first substrate or the second substrate is not required.

Hereinafter, a method of fabricating an LCD device of the third embodiment will now be described with reference to FIG. 4B.

A transparent first substrate 302 made of glass or quartz and a second substrate (not shown) are first prepared. Then, a first metal material such as Mo, Mo alloy, Al, Al alloy, Ti, Ti alloy, Ta, Ta alloy, Co, Co alloy, Ni, Ni alloy, Cu or Cu alloy is formed on the first substrate 302 and patterned using a first mask to thereby form a gate line 303, a gate electrode (not shown) and a common line 317. The common line 317 may be formed of a transparent conductive material and integrally formed with first and second common electrodes 313P1' and 313P2 through a second mask process, which will be explained later.

A transparent conductive material such as ITO (Indium Tin Oxide), IZO (Indium Zinc Oxide), ITZO (Indium Tin Zinc Oxide) or TO (Tin Oxide) is then formed on an entire surface of the first substrate 302 including the gate line 303 and the gate electrode (not shown), and patterned using a second mask thereby to form the first and second common electrodes 313P1' and 313P2. As described above, the common line 317 may be formed of a transparent conductive material and integrally formed with the first and second common electrodes 313P1' and 313P2 on the same layer.

An organic material such as SiNx or SiOx is then deposited by a CVD (Chemical Vapor Deposition) method on an entire surface of the first substrate 302 including the common line 317 and the first and second common electrodes 313P1' and 313P2 to thereby form a gate insulation film 306.

Amorphous silicon and n+ amorphous silicon are then formed on the gate insulation film 306 and patterned using a third mask to thereby form a semiconductor layer and an ohmic contact layer on the gate insulating film 306. A second metal material such as Mo, Mo alloy, Al, Al alloy, Ti, Ti alloy, Ta, Ta alloy, Co, Co alloy, Ni, Ni alloy, Cu or Cu alloy is deposited on an entire surface of the first substrate 302 including the ohmic contact layer and is patterned using a fourth mask to thereby form a data line (not shown), a source electrode formed extending from the data line, and first and second drain electrodes disposed on the semiconductor layer at a predetermined interval from the source electrode. The data line is disposed perpendicular to the gate line to define a pixel with the gate line and divides the pixel into first and second sub-pixel regions.

A transparent organic material having a low conductivity such as benzocyclobutene or acryl is then applied on an entire surface of the first substrate 302 including the source electrode and the first and second drain electrodes to thereby form a passivation film 310. Then, the passivation film 310 is patterned using a fifth mask to thereby form a first contact hole exposing part of the first drain electrode and a second contact hole exposing part of the second drain electrode.

A transparent conductive material such as ITO (Indium Tin Oxide), IZO (Indium Tin Zinc Oxide), ITZO (Indium Tin Zinc Oxide) or TO (Tin Oxide) is then deposited on the passivation film 310 and is patterned using a sixth mask to thereby form first and second pixel electrodes 315P1 and 315P2 for generating an in-plane electrode field on the first substrate 302 together with the first and second common electrodes 313P1' and 313P2. The first and second pixel electrodes 315P1 and 315P2 are connected to first and second drain electrodes constituting the first and second switching device through the first and second contact holes to receive an image signal.

Next, an organic film (not shown) such as photosensitive resin is deposited on the first substrate 302 including the first and second pixel electrodes 315P1 and 315P2 and the passivation film 310 to form a column spacer. The column spacer is formed by irradiating UV light onto the organic film through the transmitting region of a seventh mask and developing the organic film. The column spacer not only maintains a cell gap between the first substrate 302 and the second substrate, but also prevents a light leakage at the upper portions of the first and second switching devices as a black matrix. As a result, a mask process for forming a separate black matrix may be omitted in the fabricating process of the LCD device.

A first alignment film determining an initial alignment direction of liquid crystal is then applied on the first substrate 302 and a rubbing process is performed on the first alignment film. In a similar manner, a second alignment film is applied on a second substrate having a color filter layer and a rubbing process is performed on the second alignment film. The first substrate 302 and the second substrate are then attached to each other and a liquid crystal layer is provided in a space between the first substrate 302 and second substrate, thereby completing the fabricating process of the LCD device. According to the principles of the present invention, the column spacer may be formed on the second substrate. In such a case, a color filter layer including, for example, R(red), G(green), B(blue) color filters is formed on a transparent second substrate and a column spacer is formed at a region on the second substrate, which corresponds to the first and second switching devices on the first substrate, in a similar manner described above.

As described above, the present invention can reduce a defective region and a possibility of having a defective pixel in an LCD device by separately driving sub-pixel regions of a unit pixel. In addition, the vertically symmetrical electrode structure prevents a color shift phenomenon and an afterimage defect. Also, an overlapping structure between the gate line and the pixel electrodes and a horizontal alignment of the liquid crystal minimize a light leakage near the gate and data lines. Moreover, the column spacer formed on the switching devices serves as a black matrix and no black matrix is required in other areas, thereby simplifying the fabricating process and improving the aperture ratio.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device comprising:
   first and second substrates;
   a gate line and a data line on the first substrate to define a unit pixel having first and second sub-pixel regions;
   first and second switching devices in the first and second sub-pixel regions, wherein the first and second switching devices share a gate electrode, a source electrode and a semiconductor layer;
   a plurality of first and second common electrodes in the first and second sub-pixel regions;
   a plurality of first and second pixel electrodes in the first and second sub-pixel regions;
   a common line shared by the unit pixel and an adjacent unit pixel; and
   a liquid crystal layer between the first and second substrates.

2. The device of claim 1, wherein the gate electrode is formed as a part of one gate line.

3. The device of claim 1, wherein the source electrode extends from one data line.

4. The device of claim 1, wherein the first switching device further comprises a first drain electrode, and the second switching device further comprises a second drain electrode.

5. The device of claim 1, wherein the first and second sub-pixel regions are symmetrical with respect to the gate line.

6. The device of claim 1, wherein the first common electrode and the first pixel electrode form an in-plane electric field in the first sub-pixel region, and the second common electrode and the second pixel electrode form an in-plane electric field in the second sub-pixel region.

7. The device of claim 6, wherein the in-plane electric field forms an inclination angle of about 0 to about 45° with respect to the data line.

8. The device of claim 7, further comprising alignment layers on the first and second substrates.

9. The device of claim 8, wherein a rubbing direction of the alignment layer is perpendicular to the data line.

10. The device of claim 1, wherein the first and second pixel electrodes partially overlap upper and lower edges of the gate line.

11. The device of claim 1, wherein the first and second pixel electrodes overlap edges of adjacent common lines.

12. The device of claim 1, wherein the common line is formed near an interface between adjacent unit pixels.

13. The device of claim 12, wherein a common signal substantially simultaneously applies to a second common electrode of a unit pixel defined by the $n^{th}$ gate line and a first common electrode of a unit pixel defined by the $n+1^{th}$ gate line.

14. The device of claim 12, wherein the common line is formed of a metal layer.

15. The device of claim 1, further comprising a black matrix on at least one of the first and second substrates corresponding to the first and second switching devices.

16. The device of claim 15, wherein the black matrix includes a column spacer.

17. The device of claim 16, wherein the black matrix forms on at least one of the first and second substrates except at least one of the first and second substrates corresponding to the gate line and the data line.

18. The device of claim 1, further comprising:
    a first common electrode connection line electrically connecting the plurality of first common electrodes; and
    a second common electrode connection line electrically connecting the plurality of second common electrodes.

19. The device of claim 18, further comprising:
    a first pixel electrode connection line electrically connecting the plurality of first pixel electrodes; and
    a second pixel electrode connection line electrically connecting the plurality of second pixel electrodes.

20. The device of claim 19, wherein the first common electrode connection line and the first pixel electrode connection line overlap to form a first storage capacitor, and the second common electrode connection line and the second pixel electrode connection line overlap to form a second storage capacitor.

21. The device of claim 1, wherein the first and second pixel electrodes are connected to each other at an upper portion of the gate line.

22. The device of claim 1, wherein the first and second common electrodes are formed as a plate shape on the first substrate and the first and second pixel electrodes have a plurality of slits.

23. The device of claim 22, wherein intervals between the slits of the first and second pixel electrodes are narrow so as to generate a fringe electric field.

24. The device of claim 23, wherein a distance between the first common electrode and the first pixel electrode and a distance between the second common electrode and the second pixel electrode are smaller than a distance between the first substrate and the second substrate.

25. The device of claim 24, wherein the first common electrode and the first pixel electrode, and the second common electrode and the second pixel electrode form an in-plane electric field, the electric field being formed substantially at an inclination angle of 0 to 45° with respect to the data line.

26. The device of claim 25, further comprising alignment layers on the first and second substrates.

27. The device of claim 26, wherein a rubbing direction of one of the alignment layers is perpendicular to the data line.

28. The device of claim 24, wherein the first pixel electrode and the second pixel electrode are connected to each other at an upper portion of the gate line.

29. The device of claim 22, wherein the first and second common electrodes and the first and second pixel electrodes are formed of a transparent conductive material.

30. The device of claim 29, wherein the common line is formed at an interface between adjacent unit pixels.

31. The device of claim 30, wherein a second common electrode of a unit pixel defined by the $n^{th}$ gate line and a first common electrode of a unit pixel defined by the $n+1^{th}$ gate line are formed of a transparent conductive material and formed at the same time with the common line.

32. The device of claim 1, wherein the second substrate further comprises a color filter.

* * * * *